(12) United States Patent
Chen et al.

(10) Patent No.: US 12,380,548 B2
(45) Date of Patent: Aug. 5, 2025

(54) METHOD AND SYSTEM OF ADAPTABLY DETECTING DIRT, OCCLUSION AND SMUDGE ON CAMERA LENS AND IMAGE SENSOR

(71) Applicant: Climax Technology Co., Ltd., Taipei (TW)

(72) Inventors: Yi-Kai Chen, Taipei (TW); Chun-Chi Huang, Taipei (TW); Wen-Yi Chang, Taichung (TW)

(73) Assignee: Climax Technology Co., Ltd., Taipei (TW)

( * ) Notice: Subject to any disclaimer, the term of this patent is extended or adjusted under 35 U.S.C. 154(b) by 134 days.

(21) Appl. No.: 18/382,868

(22) Filed: Oct. 23, 2023

(65) Prior Publication Data

US 2025/0131546 A1 Apr. 24, 2025

(51) Int. Cl.
*G06T 7/00* (2017.01)
*G06T 7/13* (2017.01)
*H04N 23/80* (2023.01)

(52) U.S. Cl.
CPC .............. *G06T 7/0002* (2013.01); *G06T 7/13* (2017.01); *H04N 23/80* (2023.01); *G06T 2207/30168* (2013.01)

(58) Field of Classification Search
CPC .............. G06T 7/0002; G06T 7/13; G06T 2207/30168; H04N 23/80; H04N 23/811; H04N 23/81; H04N 1/4097
See application file for complete search history.

(56) References Cited

U.S. PATENT DOCUMENTS

| | | | | |
|---|---|---|---|---|
| 6,606,420 B1* | 8/2003 | Loce | ................... | G06T 5/94 382/199 |
| 11,151,405 B1* | 10/2021 | Hoffmann | ............... | G06F 18/23 |
| 12,092,467 B1* | 9/2024 | Ebrahimi Afrouzi | .. | G01C 21/32 |
| 2006/0146178 A1* | 7/2006 | Ishiga | ................... | H04N 17/002 348/363 |
| 2006/0221228 A1* | 10/2006 | Kikuchi | ................... | G01S 7/497 340/436 |

(Continued)

FOREIGN PATENT DOCUMENTS

| CN | 111246204 A | 6/2020 |
|---|---|---|
| CN | 107194886 B | 11/2020 |

OTHER PUBLICATIONS

Extended European Search Report dated Apr. 4, 2024 in related European Application No. 23205096.3.

*Primary Examiner* — Chiawei Chen
(74) *Attorney, Agent, or Firm* — Stout, Uxa & Buyan, LLP; Donald E. Stout

(57) ABSTRACT

A method of adaptably detecting dirt, occlusion and smudge on camera lens and image sensor includes capturing an image; subjecting original pixels of the image to sampling to result in sampled pixels; excluding outliers of the sampled pixels to result in retained pixels; obtaining an average value of the retained pixels; obtaining a tolerance value according to luminance values of the retained pixels; generating a threshold value for determining dirt, occlusion and smudge on camera lens and image sensor in the image according to the tolerance value and the average value of the retained pixels; and comparing a luminance value of at least one pixel of the image with a corresponding threshold value.

19 Claims, 3 Drawing Sheets

(56) References Cited

U.S. PATENT DOCUMENTS

| | | | |
|---|---|---|---|
| 2013/0162812 A1* | 6/2013 | Wu | H04N 7/183 |
| | | | 348/125 |
| 2018/0025507 A1* | 1/2018 | Hufnagel | G06T 7/74 |
| | | | 382/291 |
| 2020/0053354 A1* | 2/2020 | Tsurube | H04N 23/71 |
| 2021/0090237 A1* | 3/2021 | Asayama | G06T 7/11 |
| 2025/0117910 A1* | 4/2025 | Kamiunten | G06T 7/0002 |

* cited by examiner

METHOD AND SYSTEM OF ADAPTABLY DETECTING DIRT, OCCLUSION AND SMUDGE ON CAMERA LENS AND IMAGE SENSOR

BACKGROUND OF THE INVENTION

1. Field of the Invention

The present invention generally relates to a camera module, and more particularly to a method and system of adaptably detecting dirt, occlusion and smudge on camera lens and image sensor.

2. Description of Related Art

A camera module, such as passive infrared (PIR) camera or internet protocol (IP) camera, is a device that captures images using one or more lenses and an image sensor. The quality of the captured images may be affected by various factors, such as the properties or aging of the camera, the presence of dirt, occlusion, smudge or the lighting conditions. For example, some camera modules may exhibit vignetting in a corner of the image, or may exhibit blocking on a side or in a center area of the image. These issues may impair the performance and functionality of the camera modules.

A common method for identifying dirt, occlusion and smudge on camera lens and image sensor is to use edge detection, which is based on the changes in brightness levels. However, this approach has some limitations, as it can be influenced by the variations in the ambient conditions and the illumination source, leading to errors in the detection process.

A need has thus arisen to propose a novel scheme to overcome the drawbacks of traditional methods of detecting dirt, occlusion and smudge on camera lens and image sensor.

SUMMARY OF THE INVENTION

In view of the foregoing, it is an object of the embodiment of the present invention to provide a method and system of adaptably detecting dirt, occlusion and smudge on camera lens and image sensor without being affected by the variations in the ambient conditions and the illumination source.

According to one embodiment, a method of adaptably detecting dirt, occlusion and smudge on camera lens and image sensor includes the following steps. An image is captured, and original pixels of the image are subject to sampling to result in sampled pixels. Outliers of the sampled pixels are excluded to result in retained pixels. An average value of the retained pixels is obtained, and a tolerance value is obtained according to luminance values of the retained pixels. A threshold value for determining dirt, occlusion and smudge on camera lens and image sensor in the image is generated according to the tolerance value and the average value of the retained pixels. A luminance value of at least one pixel of the image is compared with a corresponding threshold value.

DETAILED DESCRIPTION OF THE INVENTION

Figure 1:
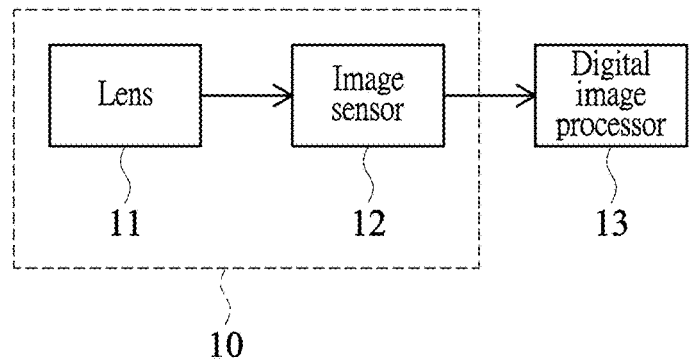
FIG. 1 shows a block diagram illustrating a system of adaptably detecting dirt, occlusion and smudge on camera lens and image sensor.
Figure 2:
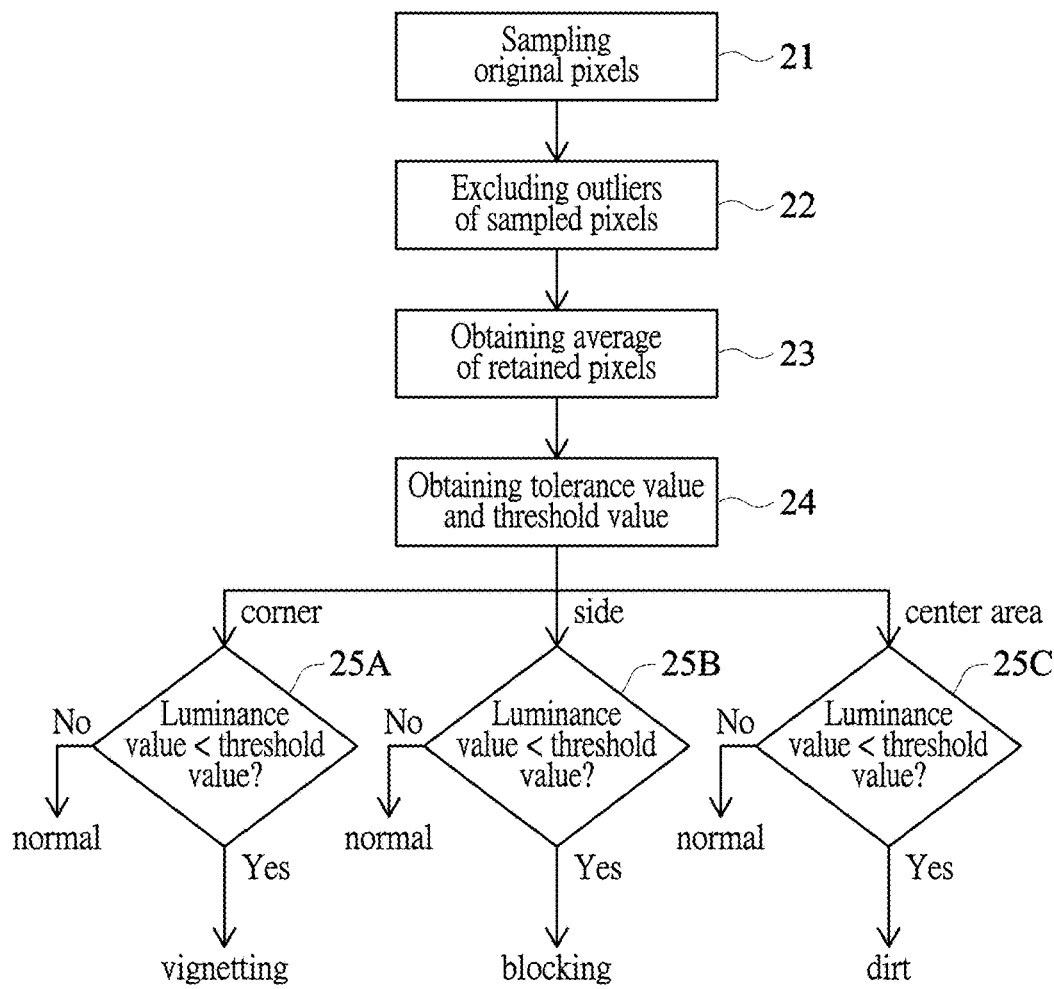
FIG. 2 shows a flow diagram illustrating a method of adaptably detecting dirt, occlusion and smudge on camera lens and image sensor according to one embodiment of the present invention adaptable to the system of FIG. 1.

FIG. 1 shows a block diagram illustrating a system 100 of adaptably detecting dirt, occlusion and smudge on camera lens and image sensor, and FIG. 2 shows a flow diagram illustrating a method 200 of adaptably detecting dirt, occlusion and smudge on camera lens and image sensor according to one embodiment of the present invention adaptable to the system 100 of FIG. 1.

As shown in FIG. 1, the system 100 of adaptably detecting dirt, occlusion and smudge on camera lens and image sensor ("system" hereinafter) may include a camera module 10 that is composed of at least one (camera) lens 11 and an image sensor 12 that is coupled to receive light focused by the lens 11 and is configured to generate (or capture) an image accordingly. In the embodiment, the captured image is a monochrome image composed of pixels of one color. The monochrome image is a type of digital image that represents the intensity of light in a range of shades of gray or another color.

The system 100 may include a digital image processor 13 that is coupled to receive the (captured) image and is configured to detect dirt, occlusion and smudge on the camera lens 11 and the image sensor 12, for example, vignetting (in a corner), blocking (on a side) or dirt (in a center area) according to the image. After the detection is complete, the digital image processor 13 may then optionally apply appropriate techniques such as correction or enhancement to improve the quality of the image. For example, the digital image processor 13 may operatively remove unwanted artifacts, adjust brightness and saturation, sharpen details, and apply filters or effects.

As shown in FIG. 2, in step 21, original pixels of the (captured) image are subject to sampling to result in sampled pixels, with a number being less than a number of the original pixels, thereby reducing the amount of data in the image by selecting a subset of pixels to represent the whole image. Sampling may be done in different ways, such as uniform sampling, non-uniform sampling or adaptive sampling. Uniform sampling means that the original pixels are mapped to the sampled pixels in a regular and consistent pattern, such as a grid or a lattice. Non-uniform sampling means that the original pixels are mapped to the sampled pixels in an irregular and inconsistent pattern, such as a random or a jittered pattern. Adaptive sampling means that the original pixels are mapped to the sampled pixels in a variable and dynamic pattern, depending on the characteristics and features of the image, such as edges or textures.

Figure 3:
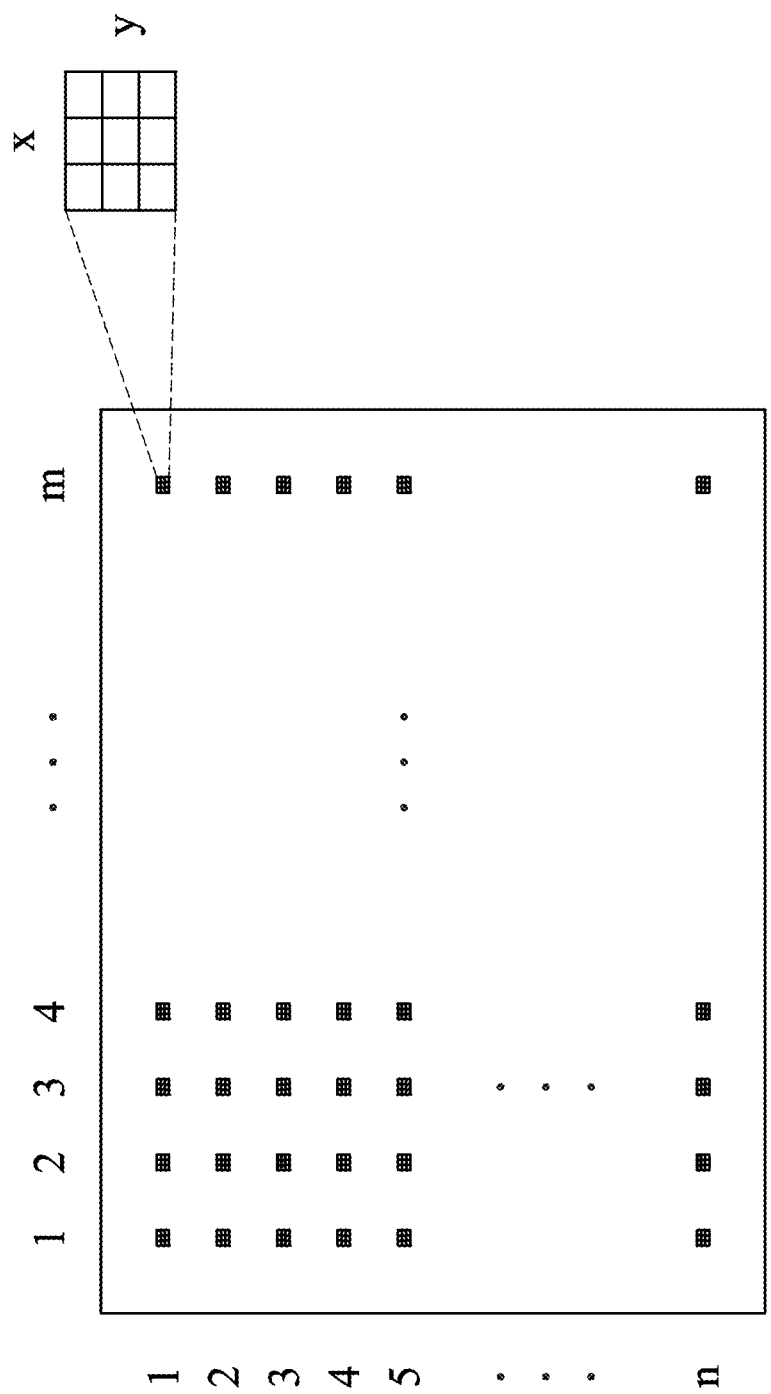
FIG. 3 shows a schematic diagram illustrating (uniform) sampled pixels of the image according to one embodiment of the present invention.

FIG. 3 shows a schematic diagram illustrating (uniform) sampled pixels of the image according to one embodiment of the present invention. Specifically, the original pixels within a rectangle of the image are sampled to result in m×n sampled pixels, where m represents a number of sampled pixels in horizontal direction and n represents a number of sampled pixels in vertical direction. Each sampled pixel may, for example, correspond to original pixels of a pixel matrix (e.g., 3×3 pixel matrix), and a luminance (or brightness) value of each sampled pixel is an average value of luminance values of the corresponding original pixels of the pixel matrix. In the specification, the term "average value" may be used to describe a single value that suitably represents a set of data. For example, a common type of average is the arithmetic mean, which is calculated by summing up all the numbers in a list and dividing the sum by the number of elements in the list. There are other types of averages that may be used to represent data, such as the median (the middle value in a sorted list), the mode (the most frequently occurring value) and the mid-range (the average of the highest and lowest values in a list). Although sampling within a rectangle is illustrated in the embodiment, it is appreciated that other schemes may be adopted. For example, in other embodiments, original pixels within a rhombus (or diamond) or along a cross of the image may be subject to sampling to result in sampled pixels.

In step 22, outliers of the sampled pixels are excluded to make results of subsequent steps more accurate. Outliers are the pixels that have values that are significantly different from the majority of the pixels in the sampled pixels. They can be caused by noise, errors or anomalies in the data. Excluding outliers can reduce the variability and bias in the data, and make it easier to apply statistical methods and algorithms for further processing.

Specifically, in the embodiment, the sampled pixels are firstly sorted from smallest to largest according to luminance values, thereby resulting in sorted (sampled) pixels. Subsequently, a predetermined (first) percentage (e.g., 10%) of the sorted pixels with smallest luminance values are removed from the sorted pixels, and a predetermined (second) percentage (e.g., 10%) of the sorted pixels with largest luminance values are removed from the sorted pixels, thereby obtaining retained pixels (e.g., with a percentage relative to the sorted pixels being 80%) with luminance values between the smallest luminance values and the largest luminance values.

In step 23, an average value of the retained pixels is obtained to represent demarcation between normal luminance and abnormal luminance. As mentioned above, in the specification, the term "average value" may, but not exclusively, be referred to arithmetic mean, median, mode or mid-range.

Next, in step 24, a tolerance value is obtained according to luminance values of the retained pixels. Specifically, in the embodiment, the tolerance value is equal to a difference between a maximum luminance value and a minimum luminance value of the retained pixels. A threshold value for determining dirt, occlusion and smudge on the camera lens 11 and the image sensor 12 in a center area of the image may be generated by subtracting the tolerance value from the average value of the retained pixels. It is noted that a threshold value for determining dirt, occlusion and smudge on the camera lens 11 and the image sensor 12 in an area (e.g., corner or side) other than the center area of the image may be generated by subtracting multiple (not necessarily an integer multiple) of the tolerance value from the average value of the retained pixels. In other words, in the embodiment, the threshold value for the center area is higher than the threshold value for the corner or the side.

Figure 4A:
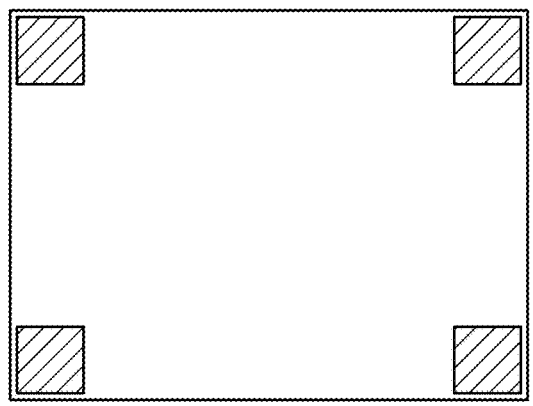
FIG. 4A shows a schematic diagram illustrating four corners of the image.

FIG. 4A shows a schematic diagram illustrating four corners of the image. Specifically, a corner is defined as an area within a predetermined percentage (e.g., 10%) of both horizontal boundary and vertical boundary (of the image). In case of the corner, the flow goes to step 25A, in which luminance value of at least one (original or sampled) pixel in a corner is compared with a corresponding threshold value. If the luminance value of at least one pixel in the corner is less than the corresponding threshold value, it is determined as vignetting in the corner; otherwise it is determined as normal in the corner.

Figure 4B:
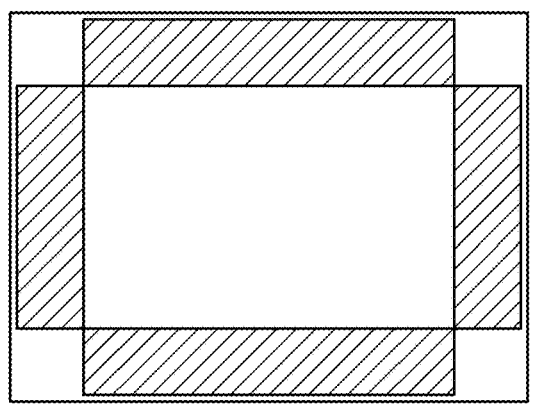
FIG. 4B shows a schematic diagram illustrating four sides of the image.

FIG. 4B shows a schematic diagram illustrating four sides of the image. Specifically, a side is defined as an area within a predetermined percentage (e.g., 10%) of either horizontal boundary or vertical boundary (but not both). In case of the side, the flow goes to step 25B, in which luminance value of at least one (original or sampled) pixel on a side is compared with a corresponding threshold value. If the luminance value of at least one pixel on the side is less than the corresponding threshold value, it is determined as blocking on the side; otherwise it is determined as normal on the side.

Figure 4C:
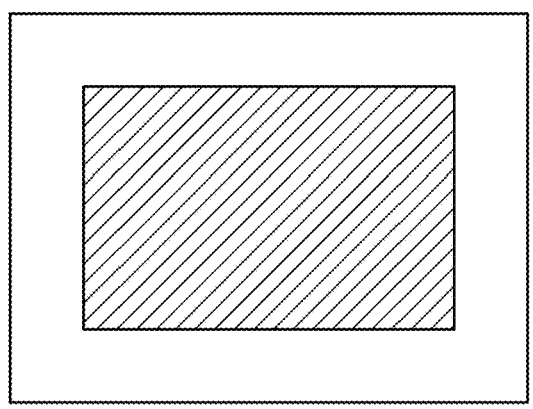
FIG. 4C shows a schematic diagram illustrating a center area of the image.

FIG. 4C shows a schematic diagram illustrating a center area of the image. Specifically, a center area is defined as an area of the image excluding the four corners and the four sides. In case of the center area, the flow goes to step 25C, in which luminance value of at least one (original or sampled) pixel in a center area is compared with a corresponding threshold value. If the luminance value of at least one pixel in the center area is less than the corresponding threshold value, it is determined as dirt (accumulated) in the center area; otherwise it is determined as normal in the center area.

Although specific embodiments have been illustrated and described, it will be appreciated by those skilled in the art that various modifications may be made without departing from the scope of the present invention, which is intended to be limited solely by the appended claims.

What is claimed is:

1. A method of adaptably detecting dirt, occlusion and smudge on a camera lens and image sensor, comprising:
   capturing an image;
   subjecting original pixels of the image to sampling to result in sampled pixels;
   excluding outliers of the sampled pixels to result in retained pixels;
   obtaining an average value of the retained pixels;
   obtaining a tolerance value according to luminance values of the retained pixels;
   generating a threshold value for determining dirt, occlusion and smudge on the camera lens and image sensor in the image according to the tolerance value and the average value of the retained pixels; and
   comparing a luminance value of at least one pixel of the image with a corresponding threshold value;
   wherein the step of excluding outliers of the sampled pixels comprises:
   sorting the sampled pixels from smallest to largest according to luminance values, thereby resulting in sorted pixels; and
   removing a predetermined first percentage of the sorted pixels with smallest luminance values from the sorted pixels, and removing a predetermined second percentage of the sorted pixels with largest luminance values from the sorted pixels, thereby obtaining the retained pixels.

2. The method of claim 1, wherein the captured image comprises a monochrome image.

3. The method of claim 1, wherein the step of subjecting original pixels of the image to sampling comprises:
   sampling original pixels within a rectangle of the image to result in m×n sampled pixels, where m represents a number of sampled pixels in horizontal direction and n represents a number of sampled pixels in vertical direction;

wherein each sampled pixel corresponds to original pixels of a pixel matrix, and a luminance value of each sampled pixel is an average value of luminance values of the corresponding original pixels of the pixel matrix.

4. The method of claim 1, wherein the tolerance value is equal to a difference between a maximum luminance value and a minimum luminance value of the retained pixels.

5. The method of claim 1, wherein the threshold value is generated by subtracting the tolerance value or a multiple of the tolerance value from the average value of the retained pixels.

6. The method of claim 5, wherein a threshold value for determining dirt, occlusion and smudge on the camera lens and image sensor in a center area of the image is generated by subtracting the tolerance value from the average value of the retained pixels.

7. The method of claim 6, wherein a threshold value for determining dirt, occlusion and smudge on the camera lens and image sensor in an area other than the center area of the image is generated by subtracting a multiple of the tolerance value from the average value of the retained pixels.

8. The method of claim 5, wherein a threshold value for a center area of the image is higher than a threshold value for an area other than the center area.

9. The method of claim 1, wherein a corner is defined as an area within a predetermined percentage of both horizontal boundary and vertical boundary of the image.

10. The method of claim 9, wherein vignetting is determined in the corner if the luminance value of at least one pixel in the corner is less than the corresponding threshold value.

11. The method of claim 9, wherein a side is defined as an area within a predetermined percentage of either horizontal boundary or vertical boundary of the image.

12. The method of claim 11, wherein blocking is determined on the side if the luminance value of at least one pixel on the side is less than the corresponding threshold value.

13. The method of claim 11, wherein a center area is defined as an area of the image excluding all corners and all sides.

14. The method of claim 13, wherein dirt is determined in the center area if the luminance value of at least one pixel in the center area is less than the corresponding threshold value.

15. The method of claim 1, wherein the image is captured by a camera module.

16. The method of claim 1, further comprising:
providing a digital image processor that is coupled to receive the image and is configured to detect dirt, occlusion and smudge on the camera lens and image sensor.

17. A system of adaptably detecting dirt, occlusion and smudge on a camera lens and image sensor, comprising:
a camera module that captures an image; and
a digital image processor coupled to receive the image and configured to detect dirt, occlusion and smudge on the camera lens and image sensor by the following steps:
subjecting original pixels of the image to sampling to result in sampled pixels;
excluding outliers of the sampled pixels to result in retained pixels;
obtaining an average value of the retained pixels;
obtaining a tolerance value according to luminance values of the retained pixels;
generating a threshold value for determining dirt, occlusion and smudge on the camera lens and image sensor in the image according to the tolerance value and the average value of the retained pixels; and
comparing a luminance value of at least one pixel of the image with a corresponding threshold value;
wherein the step of excluding outliers of the sampled pixels comprises:
sorting the sampled pixels from smallest to largest according to luminance values, thereby resulting in sorted pixels; and
removing a predetermined first percentage of the sorted pixels with smallest luminance values from the sorted pixels, and removing a predetermined second percentage of the sorted pixels with largest luminance values from the sorted pixels, thereby obtaining the retained pixels.

18. The system of claim 17, wherein the camera module comprises:
at least one lens; and
an image sensor coupled to receive light focused by the at least one lens and configured to generate the image accordingly.

19. The system of claim 17, wherein the dirt, occlusion or smudge on the camera lens and image sensor is detected if the luminance value of the at least one pixel of the image is less than the corresponding threshold value.

* * * * *